US010732902B1

(12) United States Patent
Lazier et al.

(10) Patent No.: US 10,732,902 B1
(45) Date of Patent: Aug. 4, 2020

(54) USING FEEDBACK FOR ADAPTIVE DATA COMPRESSION

(71) Applicant: Amazon Technologies, Inc., Seattle, WA (US)

(72) Inventors: Colin Laird Lazier, Seattle, WA (US); Marco Argenti, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 16/143,258

(22) Filed: Sep. 26, 2018

(51) Int. Cl.
*G06F 16/23* (2019.01)
*G06F 3/06* (2006.01)
*G06N 20/00* (2019.01)
*G06F 16/22* (2019.01)

(52) U.S. Cl.
CPC ............ *G06F 3/0661* (2013.01); *G06F 3/067* (2013.01); *G06F 3/0608* (2013.01); *G06F 16/2228* (2019.01); *G06F 16/2379* (2019.01); *G06N 20/00* (2019.01)

(58) Field of Classification Search
None
See application file for complete search history.

(56) References Cited

U.S. PATENT DOCUMENTS

| 6,310,973 B1* | 10/2001 | Persiantsev | .......... | H04N 19/503 |
| | | | | 375/E7.034 |
| 2011/0103491 A1* | 5/2011 | Saes | .................. | G01R 33/3621 |
| | | | | 375/241 |

* cited by examiner

*Primary Examiner* — Cai Y Chen
(74) *Attorney, Agent, or Firm* — Robert C. Kowert; Kowert, Hood, Munyon, Rankin & Goetzel, P.C.

(57) ABSTRACT

A hub device or edge device implements adaptive data compression. The model training service analyzes the received data. A machine learning model of the hub device receives time-series data from one or more data sources and classifies respective portions of the time-series data as respective patterns. A data compressor at the hub device generates compressed data by applying different compression techniques to the respective portions of the time-series data according to a mapping of the compression techniques to the respective patterns. The hub device then transmits the compressed data to an endpoint for processing (e.g., another device that uses the compressed data). The hub device receives feedback for the compressed data. In response to the feedback, the hub device changes one or more of the compression techniques that are mapped to the respective patterns.

20 Claims, 9 Drawing Sheets

*Before Receiving Feedback*

*After Receiving Feedback*

USING FEEDBACK FOR ADAPTIVE DATA COMPRESSION

BACKGROUND

Data collection and analysis has become increasingly important for many businesses and other organizations, resulting in large amounts of data that is collected, transmitted, stored, and analyzed. As more data is collected, more storage space is needed and more time may be needed for computers to analyze the data. Moreover, additional bandwidth is required to transmit data from the location the data was collected to another location where the data can be stored or processed. For example, a large amount of video data may be generated by security cameras and transmitted to a remote endpoint, such as a data center, for analysis.

Compressing data is a way to reduce a large amount of data to a more manageable size. Although data compression can be a useful way to deal with large volumes of collected data, it may result in too much data loss. In particular, a compression algorithm that is too aggressive may remove too much of the original data. When too much of the original data is removed, the analysis of the compressed data may produce incorrect results or inaccurate results. For example, data from a security camera may apply too much compression on video images, such that a facial recognition algorithm being may be unable to recognize an authorized employee. This may lead to incorrectly generating a security alarm and unnecessarily tying up company resources.

Figure 1:
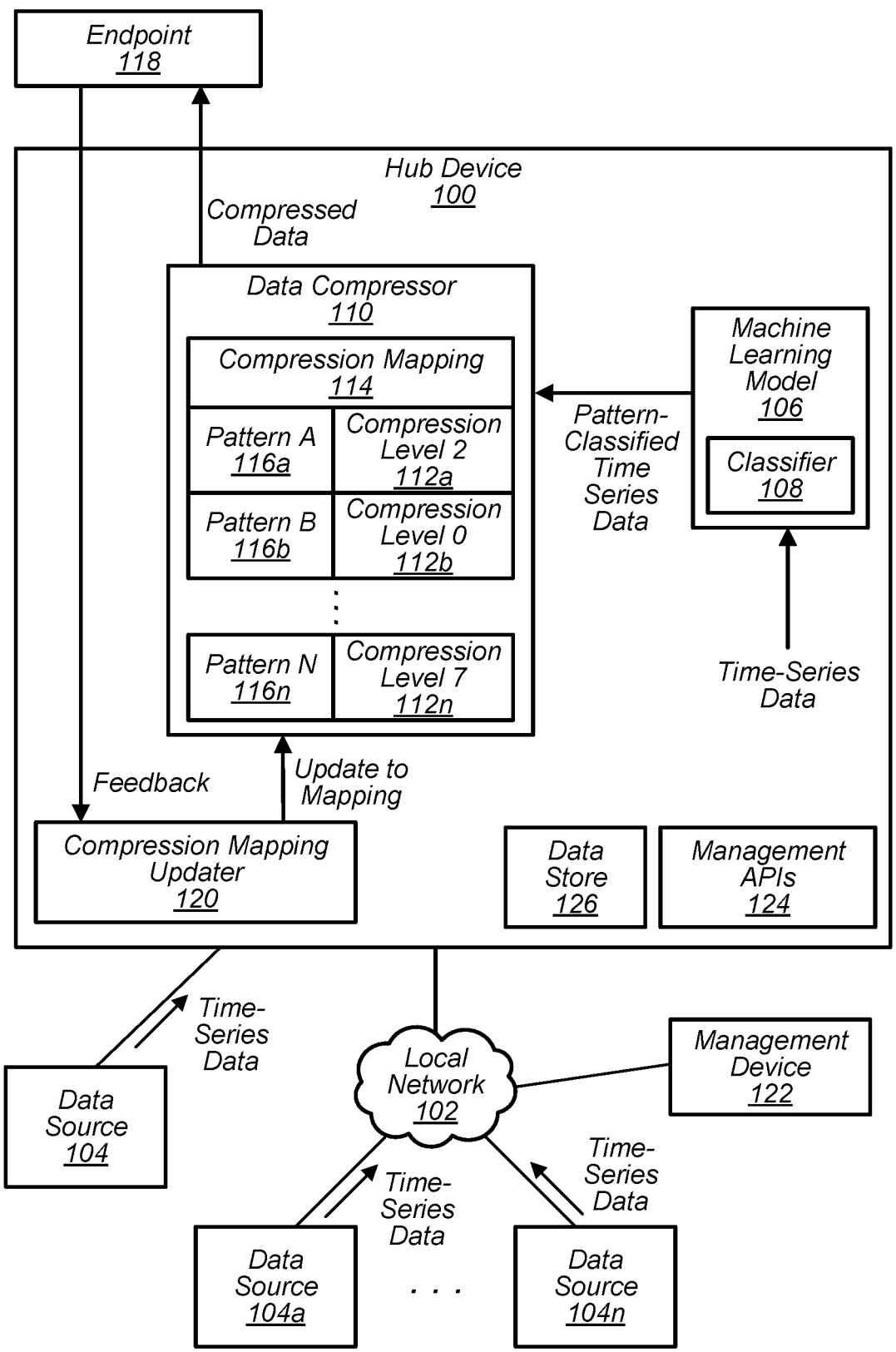
FIG. 1 illustrates a system for using feedback for adaptive data compression, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for using feedback to implement adaptive data compression. In embodiments, different portions of collected data (e.g., data collected over a period of time or "time-series data") may be classified as different patterns (e.g., using a machine learning model). The amount of compression that a data compressor applies to a given portion of data that is classified as a particular pattern may be increased or decreased over time, depending on feedback for compressed data that has been previously provided (e.g., compressed data that was sent to another device for processing).

By using feedback to implement adaptive data compression, reinforcement learning may be used to adjust the amount of compression applied to collected data over time. Therefore, embodiments may take advantage of the benefits of compressing data (e.g., reducing the amount of data to be transmitted, stored, and/or analyzed) while also ensuring that the data is not compressed too much (e.g., to avoid inaccurate or incorrect results) by implementing adaptive changes to the data compression techniques.

Therefore, embodiments may allow for greater data compression and/or more accurate results than traditional data collection or traditional data compression techniques. Traditional techniques may not use reinforcement/feedback learning to compress data, which may result in compressing data too much (causing inaccurate or incorrect results based on the compressed data) or may result in using more storage than necessary by not compressing data enough or not compressing data at all (causing increased usage of compute resources, including a larger space to store the data, increased bandwidth usage for transmission of the data, and/or increased processor usage to perform analysis on the data).

In embodiments, collected data portions that have more useful information may be compressed to a lesser degree (or not at all) because the data portions are classified as certain patterns (e.g., categories), while other collected data portions that have less useful information may be compressed to a greater degree (or discarded) because the data portions are classified as different patterns. For example, if data collected from a sensor repeats itself over a period of time (e.g., a sensor that repeatedly signals "everything is within specs"), then the data may be compressed by removing some or all of the repeating data. As another example, some or all of the frames from video feed data may be discarded if there is no motion indicated in the frames. By using compression to reduce the size of collected data, less resources are consumed to processes the data (e.g., less bandwidth to transmit the data, less storage space to store the data, and less processor usage to analyze the data).

In various embodiments, the data compressor may apply lower compression levels (or no compression) to data that varies more frequently (e.g., data portions classified as patterns that change frequently over a period of time) and apply higher compression levels (or discard the data) for data that varies less often or is constant (e.g., data portions classified as patterns that change less frequently or not at all over a time period). In embodiments, the compression levels and/or compression techniques to be applied by a data compressor for the different classifications of data may be specified by a user or a client (e.g., using a management device and/or management APIs).

As used herein, a machine learning model may be any data processing model suitable for processing input data (e.g., time-series data) to generate one or more results (e.g., pattern-classified portions of data). For example, a machine learning model may include a neural network, deep neural network, static or dynamic neural network, a memory network, and/or any other model architecture suitable for processing the collected data and generating one or more results/predictions. Thus, in embodiments, a model may include any computational model, machine learning model, or artificial intelligence model suitable for processing data, classifying data, and/or generating one or more results/predictions.

In various embodiments, any suitable security communication protocols may be used to protect data that is being sent between any devices (e.g., edge devices, tier devices, hub devices, servers, etc.) and between devices of different networks (e.g., local networks, cellular networks, provider networks). For example, data may be encrypted using SSL (secure socket layer), TLS (transport layer security), HTTPS (secure hypertext transfer protocol), and/or any other suitable network security protocol.

FIG. 1 illustrates a system for using feedback for adaptive data compression, according to some embodiments. In the illustrative embodiment, a hub device 100 is attached to a local network 102. As shown, the hub device collects time-series data from one or more data sources 104 (e.g., sensors or any other device that collects and/or provides data, such as a microphone, camera, temperature sensing device, humidity detector, vibration detector, smoke detector, motion sensor, etc.). One or more data sources may be a part of the hub device, one or more data sources may be at other locations of the network, and/or one or more data sources may be located at remote networks. Thus, the hub device may collect data from any number of data sources at any number of locations.

The hub device 100, the local network 102, and any other components depicted in FIG. 1 may be the same as or include one or more of the same components as the hub device, the local network, and any other components depicted in any of FIGS. 2-5, in embodiments. In embodiments, the hub device, the local network, the provider network, and other components depicted in any one of FIGS. 1-5 may be the same component as (e.g., same type of component) or include one or more of the same components as a hub device, local network, provider network, and other components depicted in any other one of FIGS. 1-5.

Although FIGS. 1-5 may describe a single hub device of a local network, in various embodiments any number of hub devices may be used instead of a single hub device. For example, in some embodiments, multiple hub devices may be used as redundant hub devices to add fault-tolerance to the system. If one or more hub devices fail, a remaining one or more hub devices may continue to operate as described. Thus, in embodiments, a hub device may synchronize state with one or more other hub devices (e.g., at periodic intervals or upon detecting an event such as addition of a new hub device or failure of a hub device).

In embodiments, two or more hub devices may collectively perform the various described operations instead of just one hub device. Thus, two or more hub devices may each perform a particular portion of the described operations (e.g., distributed processing). In other embodiments, a combination of redundant and distributed processing may be implemented via two or more hub devices.

In the depicted embodiment, the hub device 100 includes a machine learning model 106 that analyzes the time-series data received from the one or more data sources. The machine learning model 106 includes a classifier 108. The classifier may classify one or more respective portions of the time-series data (e.g., data collected over respective time intervals) as respective patterns to generate one or more corresponding portions of pattern-classified time series data.

In some embodiments, the machine learning model 106 may include multiple different data patterns that may be used to classify different portions of time-series data. For example the classifier may determine that a particular pattern matches the particular portion of the time-series data that was collected over an interval of time (e.g., 5 seconds, 1 minute, etc.). The machine learning model may then classify the portion of the time-series data as the particular pattern. In embodiments, the machine learning model may indicate that the portion of the time-series data is classified as the particular pattern (e.g., by generating metadata for the particular portion).

In embodiments, for the classifier to determine that the particular pattern matches the particular portion of time-series data, the classifier may determine that the particular portion of time-series data is more similar to the particular pattern than any of the other patterns included in machine learning model (e.g., the closest match). In some embodiments, the classifier may be unable to determine a match for a portion of time-series data and therefore the portion of data is not classified as a pattern. In embodiments, the machine learning model may indicate which portions of data were unable to be classified (e.g., by generating metadata for those portions).

The machine learning model 106 may be trained to classify different portions of time-series data based on an initial training data set of time-series data. For example, a remote provider network may provide the training data. In embodiments, the training data set may be obtained from the local network and/or any number of other remote networks. In some embodiments, a remote network may provide the trained machine learning model.

In the depicted embodiment, the machine learning model 106 provides one or more respective portions of the pattern-classified time series data to a data compressor 110. The data compressor 110 may then apply different compression techniques 112 to the one or more respective portions of the time-series data according to a compression mapping 114 of the compression techniques 112 to the one or more respective patterns 116 to generate compressed data.

In various embodiments, the different compression techniques 112 of the compression mapping 114 (or available for updating/adding to the compression mapping) may include any number of one or more different types of compression techniques (e.g., different compression algorithms) and/or one or more different levels of compression applied using each technique (e.g., increasing or decreasing the level of compression for a particular technique by changing one or more parameters for the compression algorithm). In some embodiments, any compression techniques (e.g., lossy compression techniques that may result in an amount of data loss) suitable for compressing data may be used (e.g., quantization, transform coding, vector quantization, joint photographic experts group (JPEG), adaptive scalable texture compression, advanced audio coding, block truncation coding, bloom filter, coding tree unit, color cell compression, companding, fractal compression, high efficiency video coding, line spectral pairs, linear predictive coding, log area ratio, parametric stereo, vocoder, wavelet scalar quantization, etc.).

As depicted, the different compression techniques 112 may result in different amounts of compression (e.g., data loss and/or reduction in the size of data). As shown, the amount of compression caused by compression technique 112b may be the smallest amount available, or no compression at all (as indicated by "Compression Level 0"). The amount of compression caused by compression technique 112a may be a moderate amount (as indicated by "Compression Level 2"). The amount of compression caused by compression technique 112n may be a much larger amount (as indicated by "Compression Level 7").

After the one or more respective portions of data are compressed, they are then transmitted to an endpoint 118 as compressed data. In some embodiments, when multiple respective portions are compressed, the data compressor 110 may provide the respective portions of compressed data in the order that the corresponding portions of data were collected by the hub device 100 or the same order that the corresponding portions of data were received from the machine learning model. In embodiments, the compressed data includes metadata associated with the respective portions indicates the order of the respective portions of compressed data.

The compressed data may be processed at the endpoint (e.g., by a data processing model) and feedback for the compressed data is provided to the hub device. The feedback may indicate that too much compression was applied to generate the compressed data or that an acceptable amount of compression was applied to generate the compressed data. For example, a data processing model for analyzing audio data may be unable to determine what type of gun was fired based on the compressed data, because too much of the audio data was lost due to too much compression applied by the data compressor 110. In this case, the feedback may indicate that too much compression was applied to generate the compressed data. However, if the data processing model is able to determine what type of gun was fired based on the compressed data, then the feedback may indicate that an acceptable amount of compression was applied.

As shown, feedback for the compressed data is received from the endpoint 118 at a compression mapping updater 120. In embodiments, the feedback for the compressed data may be received from a different endpoint. For example, the compressed data may have been transmitted from the endpoint to another device at another endpoint for processing. In various embodiments, the feedback for the compressed data may be received from any source at some point after the compressed data is transmitted to the endpoint. Furthermore, in some embodiments the endpoint may be a component within the hub device 100.

In response to receiving the feedback, the compression mapping updater 120 may change one or more of the compression techniques that are mapped to one or more respective patterns. For example, if the feedback indicates that too much compression was applied to generate the compressed data, then the compression mapping updater 120 may change one or more of the compression techniques to reduce compression that is applied by the data compressor 110. If the feedback indicates that an acceptable amount of compression was applied to generate the compressed data, then the compression mapping updater 120 may change one or more of the compression techniques to increase compression that is applied by the data compressor 110.

To reduce or increase an amount of compression that is applied to a given portion of time-series data classified as the pattern (e.g., for subsequently received portions), the data compressor 110 may adjust one or more parameters to modify the compression technique (e.g., modifying a compression parameter to increase or decrease the level of compression) or replace the compression technique with a different compression technique (e.g., a different type of compression algorithm that results in increasing or decreasing the level of compression). In response to receiving feedback, the compression mapping updater 120 may change any number of the compression techniques 112 in the compression mapping 114 as described above.

As depicted, the compression techniques 112 to be applied by a data compressor for the different classifications of data (e.g., for the different patterns) may be specified by a user or a client (e.g., using a management device 122 and/or management APIs 124). For example, a user may specify a compression technique that applies a high compression level (e.g., Level 7) for Pattern N 116n and another compression technique that applies a low compression level (e.g., Level 2) for Pattern A 116a. As discussed herein, in some embodiments, the compression mapping 114 is mapped according to a default or initial configuration (e.g., provided by a remote provider network).

In various embodiments, a data store 126 may store any number of compression techniques (e.g., software code for implementing different compression algorithms). A user may select any of the compression techniques stored in the data store 126 and configure the compression mapping 114 to map a compression technique to one or more different patterns 116.

In embodiments, any other data or components of the hub device may be stored in the data store 126 (e.g., collected time-series data, pattern-classified time-series data, compressed data, machine learning models, etc.). For example, the machine learning model may store some or all of the compressed data generated by the data compressor, at least for a threshold period of time. The machine learning model 106 (or another machine learning model of the hub device) may predict which patterns of time-series data are going to be collected (e.g., during a future time interval) and indicate how much capacity is available in the data store 126 (or any other data store of the hub device) based on how much compressed data the machine learning model predicts will be generated (e.g., how much of the time-series data will be retained and/or discarded).

In some embodiments, the machine learning model may predict, based on the amount of time-series data that has been classified as one or more particular patterns during a previous time interval (or based on a trend of the classification of the time-series data over a previous time interval), an amount of time-series data that will be classified as the one or more particular patterns during a subsequent time interval. The machine learning model may then predict, based on the current available capacity of the data store 126, how much capacity is available (e.g., to store additional data) in the data store 126 during the subsequent time interval or at the end of the subsequent time interval.

Figure 2A:
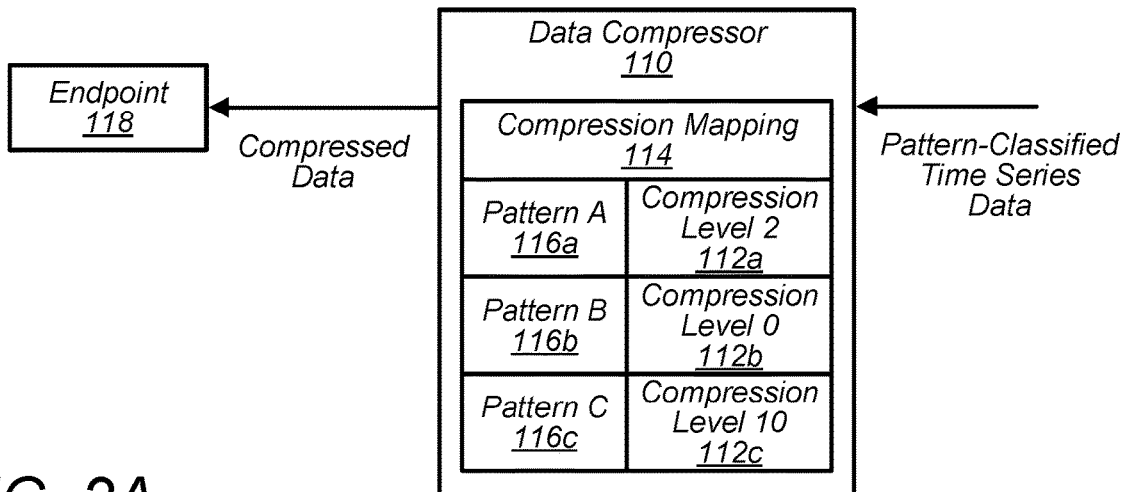
FIG. 2A is a block diagram of a data compressor that compresses pattern-classified time series data according to a compression mapping, according to some embodiments.

FIG. 2A is a block diagram of a data compressor that compresses pattern-classified time series data according to a compression mapping, according to some embodiments. In the depicted embodiment, the data compressor 110 receives three portions of pattern-classified time series data from the machine learning model 106.

A first portion is classified as pattern A 114a, a second portion is classified as pattern B 114b, and a third portion is classified as pattern C 114c. The data compressor 110 compresses the first portion using compression technique 112a, compresses the second portion using compression technique 112b, and compresses the third portion using compression technique 112c. The data compressor 110 sends the three portions of compressed data to the endpoint 118 for processing.

Figure 2B:
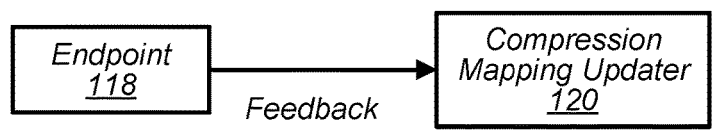
FIG. 2B is a block diagram of a compression mapping updater that receives feedback from an endpoint that indicates too much compression was applied by the data compressor, according to some embodiments.

FIG. 2B is a block diagram of a compression mapping updater that receives feedback from an endpoint that indicates too much compression was applied by the data compressor, according to some embodiments. In the depicted embodiment, the data compressor 110 receives feedback for the compressed data from the endpoint.

In some embodiments, the feedback may indicate a relative degree that the compression is to be reduced or increased for portions of the compressed data. For example, the feedback may indicate that the compression applied to the first portion was over-compressed by a small amount (e.g., less than a threshold amount of over-compression). The feedback may indicate that the compression applied to the second portion was acceptable (e.g., less than a threshold amount of under-compression or more than the threshold amount of under-compression). The feedback may indicate that the compression applied to the third portion was over-compressed by a larger amount than the first portion (e.g., more than the threshold amount of over-compression).

In various embodiments, the compression mapping updater 120 determines, based on analyzing the feedback, by how much portions data were over-compressed and under-compressed and the relative degree that the compression is to be reduced or increased for portions of the compressed data (as discussed above). For example, the feedback may include one or more results based on processing of each portion of the compressed data that was provided to the endpoint. The compression mapping updater 120 may analyze the results and determine, based on the analysis, the relative degree (e.g., the number of levels) that the compression is to be reduced or increased for portions of the compressed data.

Figure 2C:
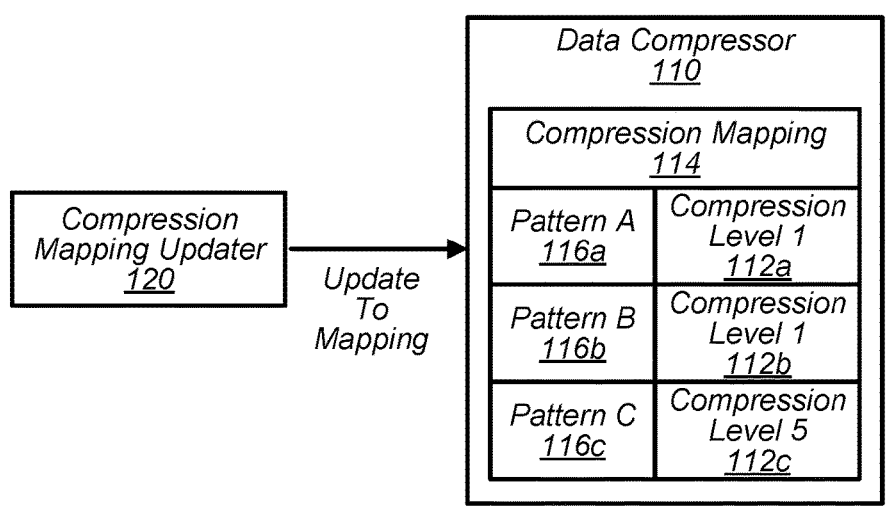
FIG. 2C is a block diagram of a compression mapping updater that updates the compression mapping of a data compressor, according to some embodiments.

FIG. 2C is a block diagram of a compression mapping updater that updates the compression mapping of a data compressor, according to some embodiments. In the depicted embodiment, the data compressor 110 changes the compression techniques that are mapped to the respective patterns based on the feedback (or based on analysis of the feedback).

In response to determining that the compression applied to the first portion was over-compressed by a small amount (e.g., less than a threshold amount of over-compression), the compression mapping updater may change the compression technique that is mapped to pattern A 114a so that the new compression technique 112d applies a lower level of compression (Level 1 instead of Level 2) for portions of data that are classified as pattern A 114a. In response to determining that the compression applied to the third portion was over-compressed by a larger amount than the first portion (e.g., more than the threshold amount of over-compression), the compression mapping updater may change the compression technique that is mapped to pattern C 114c so that the new compression technique 112f applies a much lower level of compression (Level 5 instead of Level 10) for portions of data that are classified as pattern C 114c. This greater reduction in compression may be due to the larger amount of over-compression of the third portion of compressed data (e.g., more than the threshold amount of over-compression).

In some embodiments, based on determining that the compression applied to the second portion was acceptable (e.g., less than a threshold amount of under-compression), the compression mapping updater may make no changes to the compression technique that is mapped to pattern B 114b. However, in the depicted embodiment, based on determining that the compression applied to the second portion was acceptable, but had more than the threshold amount of under-compression, the compression mapping updater may change the compression technique that is mapped to pattern B 114b so that the new compression technique 112e applies a higher level of compression (Level 1 instead of Level 0) for portions of data that are classified as pattern B 114b.

Figure 3A:
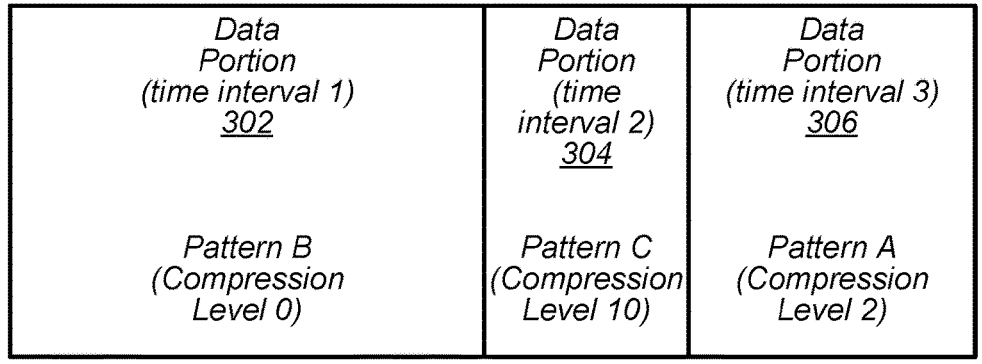
FIG. 3A is a block diagram of pattern-classified time series data that has been compressed according to the compression mapping of FIG. 2A, according to some embodiments.

FIG. 3A is a block diagram of pattern-classified time series data that has been compressed according to the compression mapping of FIG. 2A, according to some embodiments. As shown, the first compressed data portion 302 may be derived from uncompressed data that was collected during a first time interval (time interval 1), the second compressed data portion 304 may be derived from data that was collected during a second time interval (time interval 2 occurring after time interval 1), and the third compressed data portion 306 may be derived from data that was collected during a third time interval (time interval 3 occurring after time interval 2).

Figure 3B:
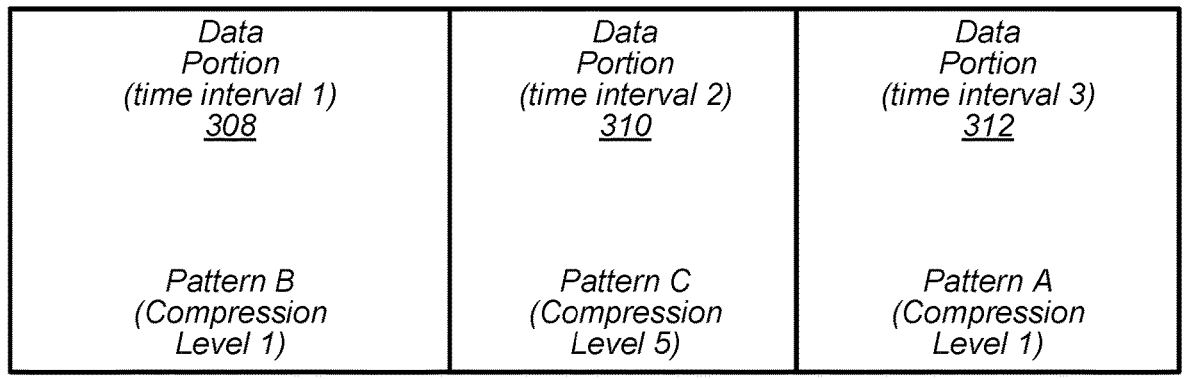
FIG. 3B is a block diagram of pattern-classified time series data that has been compressed according to the updated compression mapping of FIG. 2C, according to some embodiments.

The relative sizes of each box representing the data portions 302, 304, 306 in FIGS. 3A and 3B may provide an indication of the level of compression applied to each portion. However, the relative sizes do not necessarily correspond to the sizes of each data portion. The compression levels of each portion are based on the compression mapping 114 of the data compressor 110, before receiving the feedback (see FIG. 2A). In some embodiments, these compression levels may be initial levels or default levels assigned to the compression mapping 114.

FIG. 3B is a block diagram of pattern-classified time series data that has been compressed according to the updated compression mapping of FIG. 2C, according to some embodiments. As shown, the fourth compressed data portion 308 may be derived from uncompressed data that was collected during a fourth time interval (time interval 4 occurring after time interval 3), the fifth compressed data portion 310 may be derived from data that was collected during a fifth time interval (time interval 5 occurring after time interval 4), and the sixth compressed data portion 312 may be derived from data that was collected during a sixth time interval (time interval 6 occurring after time interval 5).

The depicted compression levels of each portion are based on the compression mapping 114 of the data compressor 110, after receiving the feedback (see FIG. 2C). As shown, the compression techniques mapped to each of the patterns was changed, as a result of receiving the feedback for the previous compressed data portions of FIG. 3A.

Figure 4:
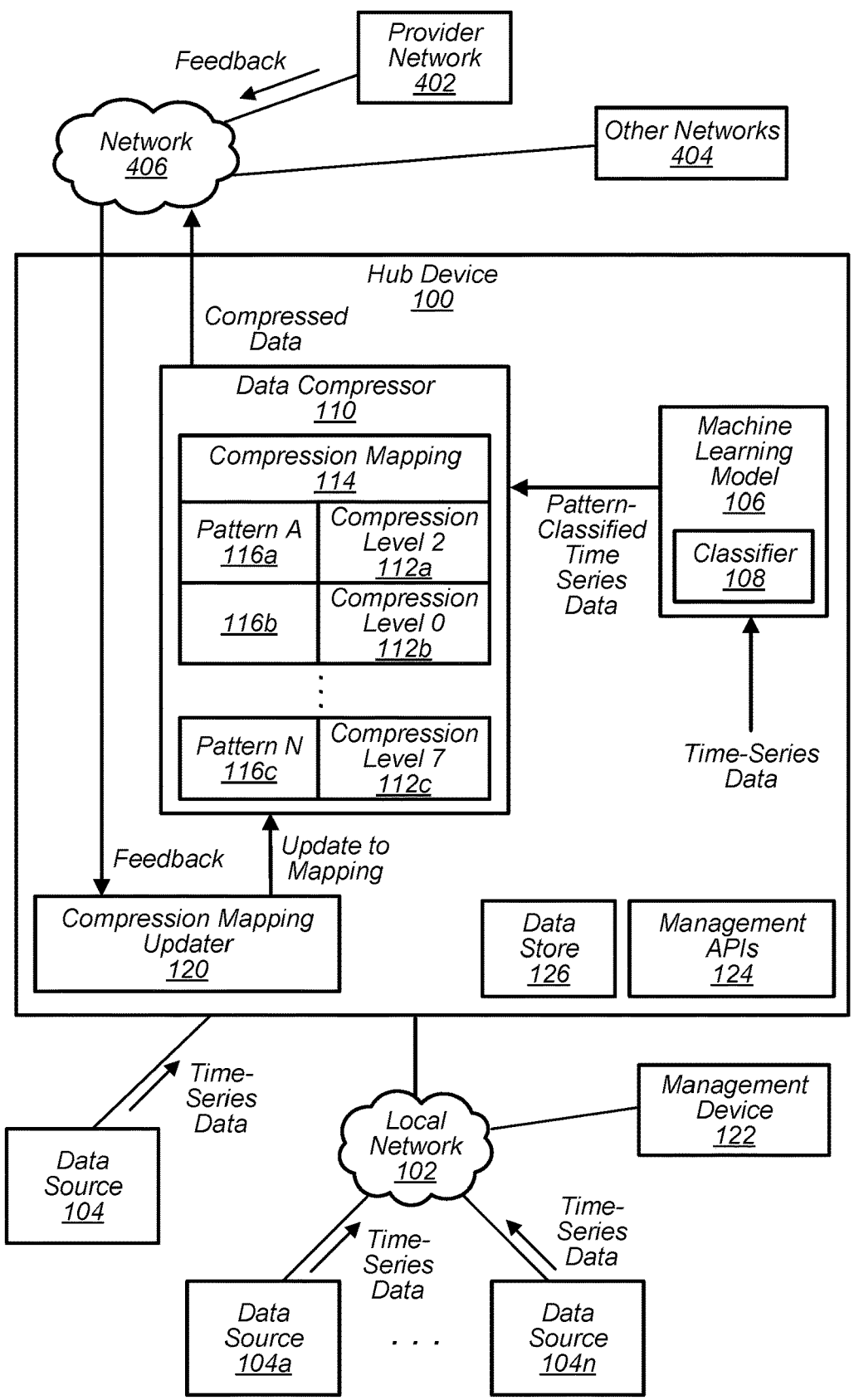
FIG. 4 illustrates a system for using feedback from a remote provider network for adaptive data compression at a hub device of a local network, according to some embodiments.

FIG. 4 illustrates a system for using feedback from a remote provider network for adaptive data compression at a hub device of a local network, according to some embodiments. The hub device 100 may operate in the same or similar manner as the hub device described in FIG. 1.

In the depicted embodiment, compressed data may be transmitted to a provider network 402 for processing and/or one or more other networks 404 for processing using a wide-area network 406 (e.g., the internet). Therefore, any device at the provider network 402 or another remote network 404 may be the endpoint 118 as described for FIG. 1.

In embodiments, the hub device 100 may receive, from the remote provider network 402, the machine learning model 106, the compression mapping 114, the compression mapping updater 120, or any other component of the hub device 100. The hub device may then install the received components. In some embodiments, the machine learning model may be trained using a time-series training data set obtained from the local network 102, the provider network 402, and/or one or more other networks 404.

The machine learning model may be re-trained at multiple times (e.g., at periodic intervals) based on new training data obtained from one or more of the above sources. The re-training may improve the ability of the model to classify portions of collected data. This, in turn, may improve the quality of the compressed data. In some embodiments, updates to the machine learning model 106 (e.g., new software code to implement the model) may be received from the provider network 402 and applied to the machine learning model 106. The updates may improve the ability of the model to classify portions of collected data. This may also improve the quality of the compressed data.

In some embodiments, the hub device 100 and/or components of the hub device may be located at a remote network to implement adaptive data compression at the remote provider (e.g., provider network 402). For example, the provider network 402 may collect time-series data from one or more of the data sources 104 and/or one or more other data sources of other networks, and provide compressed data back down to the local network 102 of the client for storage by the client. In such embodiments, a device of the client network 102 may process the compressed data and provide feedback to the compression mapping updater 120 of the provider network. Therefore, in embodiments, one or more devices of the client network 102 may serve as the endpoint 118 of FIG. 1, and the functionality of the hub device 100 of FIG. 1 may be provided by the provider network 402.

Figure 5:
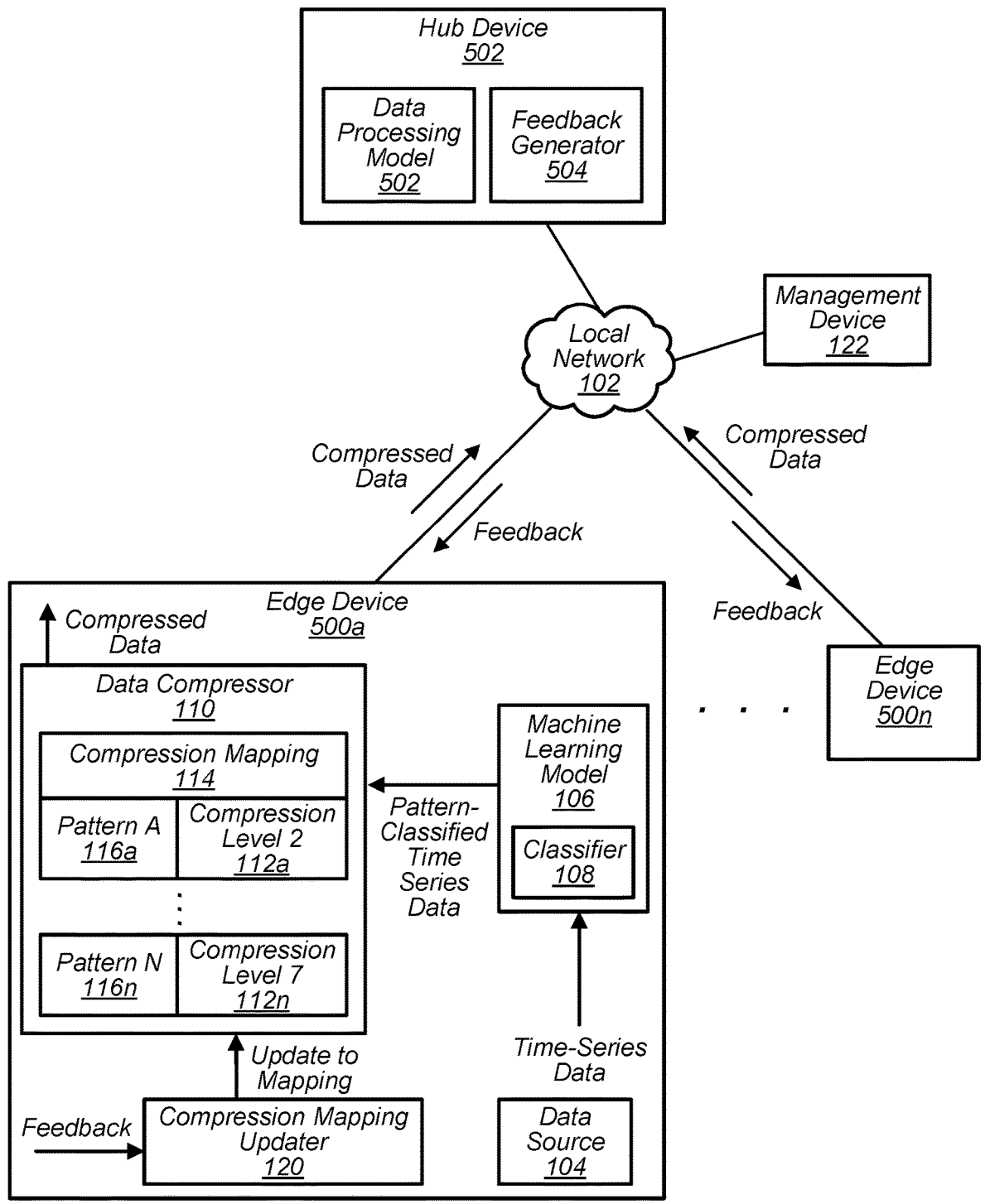
FIG. 5 illustrates a system for using feedback from a hub device of a local network for adaptive data compression at an edge device of the local network, according to some embodiments.

FIG. 5 illustrates a system for using feedback from a hub device of a local network for adaptive data compression at an edge device of the local network, according to some embodiments. The edge device 500 may operate in the same or similar manner as the hub device 100 described in FIG. 1. For example, the various components of the edge device 500 may operate in the same or similar manner as described for those components described for FIG. 1.

As depicted, the edge device 500 and another other number of edge devices 500 may include a machine learning model, a data compressor, and a compression mapping updater. Although not depicted, the edge device 500 and another other number of edge devices 500 may include any other components described for the hub device 100 in various other figures (e.g., data store, etc.).

An edge device 500 may include a data source 104 or be attached to a data source. For example, the edge device 500 may include any type of sensor to collect time-series data. After compression of one or more portions of pattern-classified time-series data, the compressed data may be sent to a hub device 100 via the local network 102.

As shown, the hub device may include a data processing model 502 that processes the compressed data to produce one or more results. A feedback generator 504 may analyze the results and, based on the analysis, generate feedback for the compressed data (or different portions of the compressed data) that was previously provided by the data compressor 110. For example, the feedback generator 504 may determine whether the results satisfy one or more criteria. In embodiments, the one or more criteria may include results must meet a threshold accuracy level (e.g., at least 90% of results are accurate or correct) and/or results must meet a threshold confidence level (e.g., at least 90% confidence (or probability) that results are accurate or correct).

In embodiments, the generated feedback may indicate any of the information described herein. For example, if the results do not satisfy the one or more criteria, then the feedback may indicate that too much compression was applied to one or more portions and if the results satisfy the one or more criteria, then the feedback may indicate that an acceptable amount of compression was applied to one or more portions. As discussed above, the feedback may indicate a relative degree that the compression is to be reduced or increased for portions of the compressed data.

The feedback generator 504 may transmit the feedback to the edge device 500a. The compression mapping updater 120 may then perform as described above. For example, compression mapping updater 120 may change one or more of the compression techniques that are mapped to one or more respective patterns. This may allow the data compressor 110 to apply a more appropriate and efficient amount of compression to subsequently received portions of data.

Figure 6:
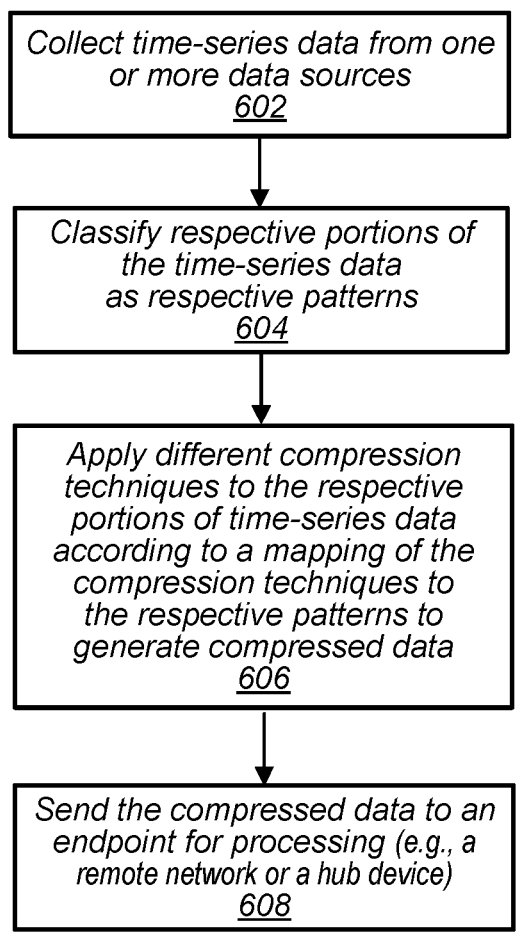
FIG. 6 is a flow diagram that illustrates classifying and compressing portions of time-series data and sending the compressed data to an endpoint, according to some embodiments.

FIG. 6 is a flow diagram that illustrates classifying and compressing portions of time-series data and sending the compressed data to an endpoint, according to some embodiments. At block 602, a hub device (or edge device) collects time-series data from one or more data sources. At block 604, a machine learning model classifies respective portions of the time-series data as respective patterns.

At block 606, a data compressor applies different compression techniques to the respective portions of time-series data according to a mapping of compression techniques to the respective patterns to generate compressed data. At block 608, the data compressor sends the compressed data to an endpoint for processing. As discussed above, the endpoint may be a device of the local network or a remote network. In some embodiments, the endpoint may be specified as a network address (e.g., an internet protocol (IP) address).

Figure 7:
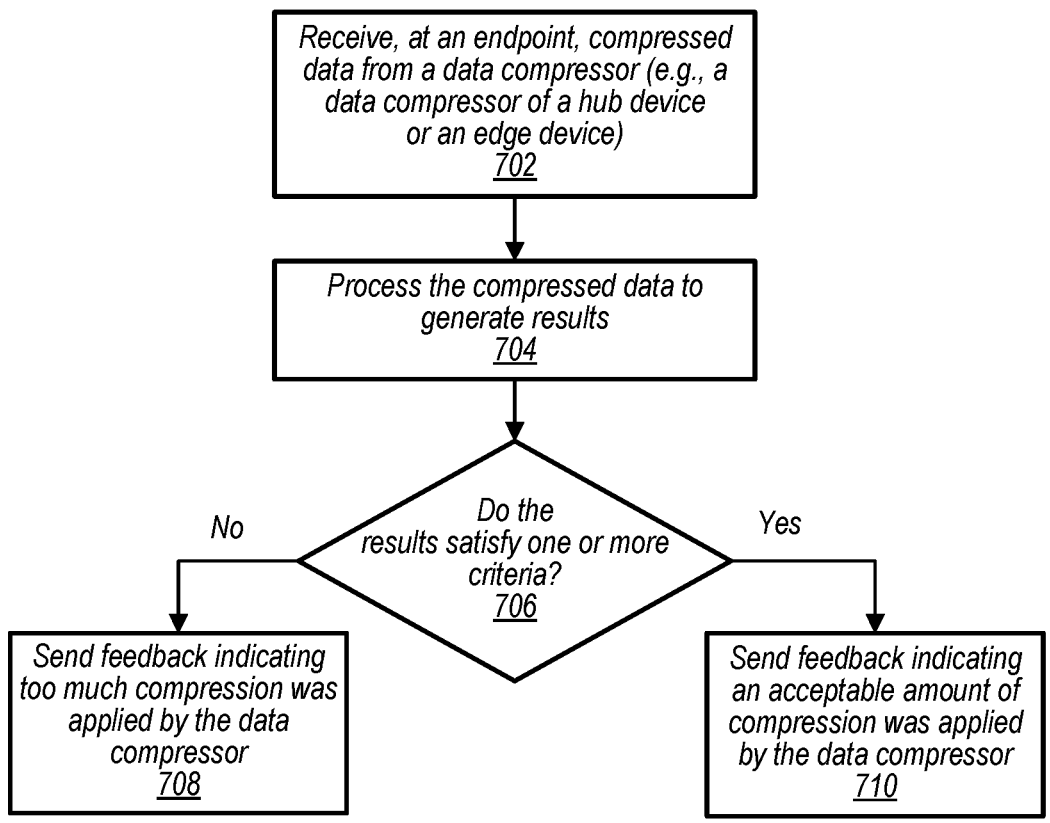
FIG. 7 is a flow diagram that illustrates processing compressed data at an endpoint and sending feedback indicating whether too much compression was applied by the data compressor, according to some embodiments.

FIG. 7 is a flow diagram that illustrates processing compressed data at an endpoint and sending feedback indicating whether too much compression was applied by the data compressor, according to some embodiments. At block 702, an endpoint (e.g., a device at the endpoint) receives compressed data from a data compressor (e.g., a hub device or an edge device).

At block 704, the endpoint device at the endpoint processes the compressed data to generate results. At block 706, the endpoint device determines whether the results satisfy one or more criteria (e.g., for accuracy, confidence, etc.). If the results do not satisfy the one or more criteria, then at block 708, the endpoint device sends feedback to the hub device or edge device (e.g., to the compression mapping updater) that indicates too much compression was applied by the data compressor. If the results do satisfy the one or more criteria, then at block 710, the endpoint device sends feedback to the hub device or edge device (e.g., to the compression mapping updater) that indicates an acceptable amount of compression was applied by the data compressor.

Figure 8:
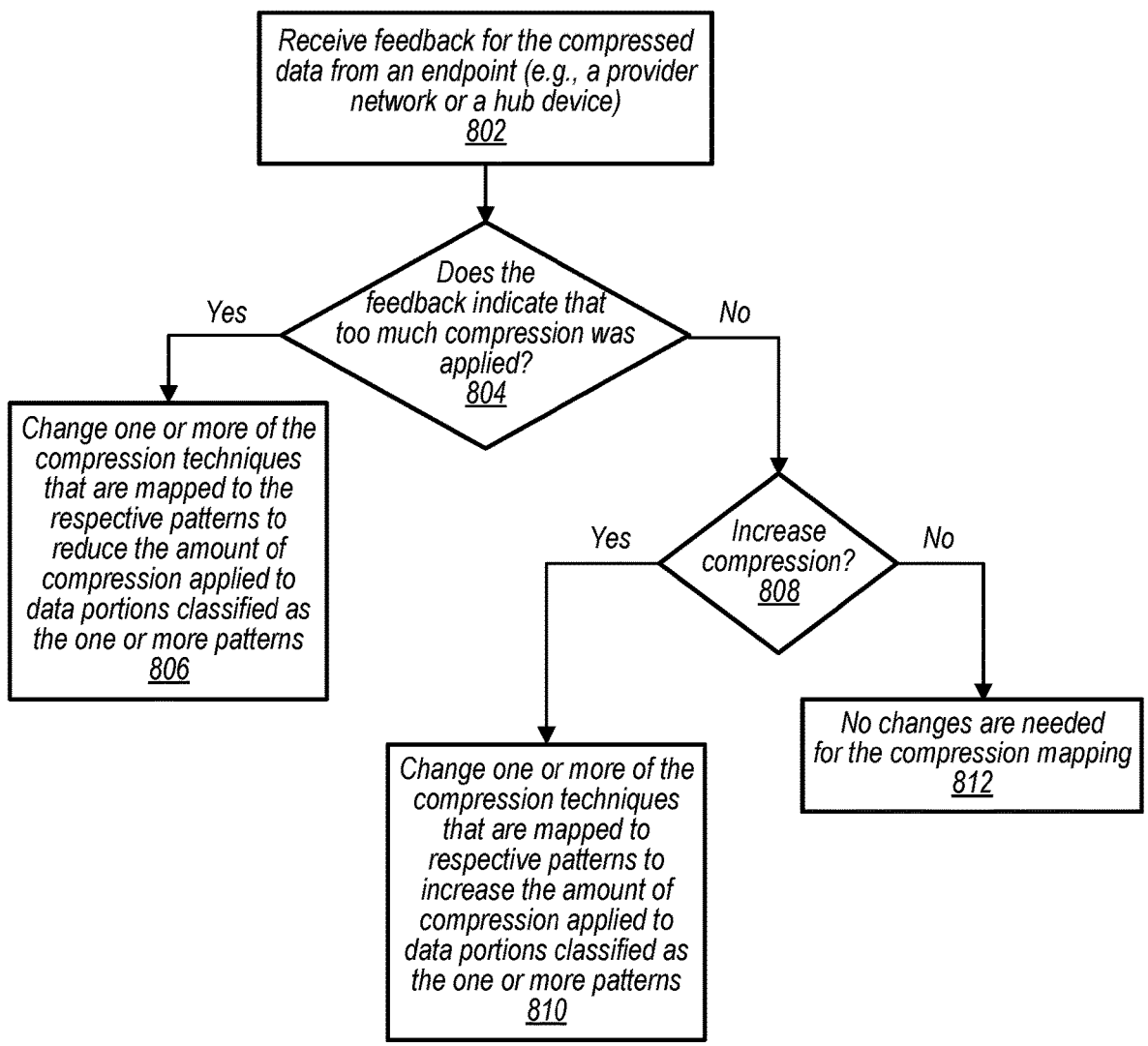
FIG. 8 is a flow diagram that illustrates receiving feedback from an endpoint and increasing or decreasing the amount of compression applied to data, according to some embodiments.

FIG. 8 is a flow diagram that illustrates receiving feedback from an endpoint and increasing or decreasing the amount of compression applied to data, according to some embodiments. At block 802, the compression mapping updater receives feedback for the compressed data from an endpoint. At block 804, the compression mapping updater determines whether too much compression was applied based on the feedback (e.g., the results may indicate whether too much compression was applied). If so, then the flow proceeds to block 806.

At block 806, the compression mapping updater changes one or more of the compression techniques that are mapped to the respective patterns to reduce the amount of compression applied to data portions classified as the one or more patterns. Returning to block 804, if the compression mapping updater determines, based on the feedback, that too much compression was not applied (e.g., an acceptable amount of compression was applied), then at block 808, the compression mapping updater determines whether to increase an amount of compression to be applied by the data compressor.

As discussed above, if the compression mapping updater determines that there is a high degree of under-compression (e.g., more than a threshold amount of under-compression), then at block 810, the compression mapping updater changes one or more of the compression techniques that are mapped to respective patterns to increase the amount of compression applied to data portions classified as the one or more patterns. This may occur if the feedback indicates that additional compression may occur with harming accuracy of results and/or without causing inaccurate results at the endpoint.

At block 808, if the compression mapping updater determines that there is not a high degree of under-compression, then at block 812, the compression mapping updater does not make any changes to the compression mapping. This may occur if the feedback indicates that additional compression will cause inaccurate or incorrect results at the endpoint.

Any of various computer systems may be configured to implement processes associated with the hub device, edge devices, data sources, local network, provider network, or any component of the above figures. For example, FIG. 9 is a block diagram illustrating an example computer system that implements some or all of the techniques described herein, according to some embodiments.

Figure 9:
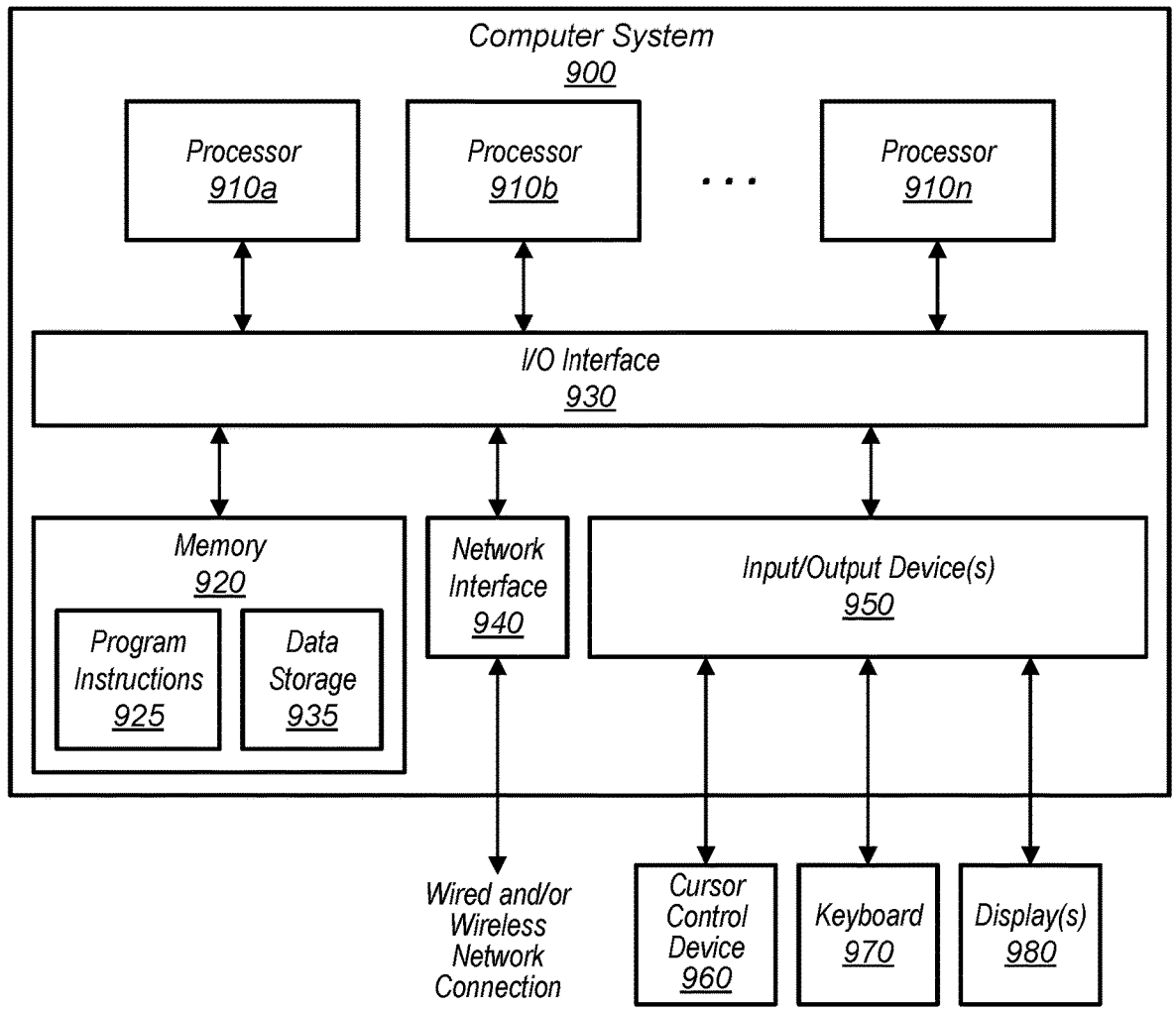
FIG. 9 is a block diagram illustrating an example computer system that implements some or all of the techniques described herein, according to some embodiments.

In various embodiments, the provider network, base station, hub devices, edge devices, tier devices, or any other component of any of FIGS. 1-8 may each include one or more computer systems 900 such as that illustrated in FIG. 9. In embodiments, the provider network, base station, hub devices, edge devices, tier devices, or any other component may include one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 920 as program instructions 925. In some embodiments, system memory 920 may include data 935 which may be configured as described herein.

In one embodiment, I/O interface 930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 940 may be configured to allow data to be exchanged between computer system 900 and other computer systems 900 or devices attached to a network, such as the local network discussed above, a wide-area network, or a local network within the provider network, for example. In particular, network interface 940 may be configured to allow communication between computer system 900 and/or various I/O devices 950. I/O devices 950 may include scanning devices, display devices, input devices and/or other communication devices, as described herein.

Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device 960, keyboard 970, or display(s) 980 may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement any of the functionality described herein (e.g., the functionality of the hub device, edge devices, data sources, and/or any components of the devices such as the machine learning model, data compressor, compression mapping updater, management APIs, data processing module, feedback generator, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more processors; and
   one or more memories, wherein the one or more memories have stored thereon instructions, which when executed by the one or more processors, cause the one or more processors to:
   collect time-series data from one or more data sources;
   classify respective portions of the time-series data as respective patterns;
   apply different compression techniques to the respective portions of the time-series data according to a mapping of the compression techniques to the respective patterns to generate compressed data;
   send the compressed data to an endpoint for processing;
   receive feedback for the compressed data; and
   in response to the feedback, change one or more of the compression techniques that are mapped to the respective patterns.

2. The system as recited in claim 1, wherein to classify respective portions of the time-series data as respective patterns, the instructions cause the one or more processors to:
   classify, by a machine learning model, the respective portions of the time-series data as the respective patterns, wherein the machine learning model is trained to classify the respective portions of the time-series data based on an initial training data set of time-series data.

3. The system as recited in claim 1, wherein the feedback indicates that too much compression was applied to generate the compressed data, and wherein to change a compression technique that is mapped to a pattern, the instructions cause the one or more processors to:
   change the compression technique to reduce an amount of compression applied to a given portion of time-series data classified as the pattern.

4. The system as recited in claim 3, wherein to reduce an amount of compression applied to a given portion of time-series data classified as the pattern, the instructions cause the one or more processors to:
   adjust one or more parameters to modify the compression technique, or
   replace the compression technique with a different compression technique.

5. The system as recited in claim 1, wherein the feedback indicates that an acceptable amount of compression was applied to generate the compressed data, and wherein to change a compression technique that is mapped to a pattern, the instructions cause the one or more processors to:

change the compression technique to increase an amount of compression applied to a given portion of time-series data classified as the pattern.

6. A method, comprising:

performing, by one or more computing devices:

collecting data from one or more data sources;

classifying one or more portions of the data as one or more respective patterns;

applying different compression techniques to the one or more respective portions of the time-series data according to a mapping of the compression techniques to the one or more respective patterns to generate compressed data;

sending the compressed data to an endpoint;

receiving feedback for the compressed data; and in response to receiving the feedback, changing one or more of the compression techniques that are mapped to the one or more respective patterns.

7. The method as recited in claim 6, wherein classifying the one or more portions of the data as one or more respective patterns comprises:

classifying, by a machine learning model, the one or more respective portions of the time-series data as the one or more respective patterns, wherein the machine learning model is trained to classify the one or more respective portions of the time-series data based on an initial training data set of time-series data.

8. The method as recited in claim 7, further comprising one or more of:

receiving the machine learning model from a remote provider network, or receiving the mapping of the compression techniques to the one or more respective patterns from the remote provider network.

9. The method as recited in claim 6, wherein the feedback indicates that too much compression was applied to generate the compressed data, and wherein changing a compression technique that is mapped to a pattern comprises:

changing the compression technique to reduce an amount of compression applied to a given portion of time-series data classified as the pattern.

10. The method as recited in claim 9, wherein reducing an amount of compression applied to a given portion of time-series data classified as the pattern comprises:

adjusting one or more parameters to modify the compression technique, or replacing the compression technique with a different compression technique.

11. The method as recited in claim 6, wherein the feedback indicates that an acceptable amount of compression was applied to generate the compressed data, and wherein changing a compression technique that is mapped to a pattern comprises:

changing the compression technique to increase an amount of compression applied to a given portion of time-series data classified as the pattern.

12. The method as recited in claim 6, wherein sending the compressed data to an endpoint for processing comprises:

sending the compressed data to a remote provider network.

13. The method as recited in claim 6, wherein an edge device attached to a network comprises the one or more computing devices, and wherein sending the compressed data to an endpoint for processing comprises:

sending the compressed data to a hub device attached to the network.

14. The method as recited in claim 6, further comprising:

receiving data from one or more remote networks; and training the machine learning model using at least the data from the one or more remote networks.

15. One or more non-transitory computer-accessible storage media storing program instructions that when executed on or across one or more processors:

collect time-series data from one or more data sources;

classify respective portions of the time-series data as respective patterns;

apply different compression techniques to the respective portions of the time-series data according to a mapping of the compression techniques to the respective patterns to generate compressed data;

send the compressed data to an endpoint;

receive feedback for the compressed data; and in response to the feedback, change one or more of the compression techniques that are mapped to the respective patterns.

16. The one or more storage media as recited in claim 15, wherein to classify respective portions of the time-series data as respective patterns, the program instructions when executed on or across the one or more processors:

classify, by a machine learning model, the respective portions of the time-series data as the respective patterns, wherein the machine learning model is trained to classify the respective portions of the time-series data based on an initial training data set of time-series data.

17. The one or more storage media as recited in claim 16, the program instructions when executed on or across the one or more processors:

receive, from a remote provider network, one or more of:

the machine learning model, or the mapping of the compression techniques to the respective patterns.

18. The one or more storage media as recited in claim 15, wherein the feedback indicates that too much compression was applied to generate the compressed data, and wherein to change a compression technique that is mapped to a pattern, the program instructions when executed on one or more processors:

change the compression technique to reduce an amount of compression applied to a given portion of time-series data classified as the pattern.

19. The one or more storage media as recited in claim 15, wherein to send the compressed data to an endpoint for processing, the program instructions when executed on or across the one or more processors:

send the compressed data to a remote provider network for processing.

20. The one or more storage media as recited in claim 15, wherein the program instructions when executed on or across the one or more processors:

receive, from an endpoint, a different mapping of compression techniques to the respective patterns; and replace the mapping of the compression techniques to the respective patterns with the different mapping of compression techniques to the respective patterns.

\* \* \* \* \*